US012203606B2

(12) United States Patent
Lin et al.

(10) Patent No.: US 12,203,606 B2
(45) **Date of Patent: *Jan. 21, 2025**

(54) LIGHTING APPARATUS

(71) Applicant: XIAMEN LEEDARSON LIGHTING CO., LTD, Fujian (CN)

(72) Inventors: Hongbin Lin, Fujian (CN); Yongjun Bao, Fujian (CN); Shenghong Liu, Fujian (CN); Lianguang Wang, Fujian (CN)

(73) Assignee: XIAMEN LEEDARSON LIGHTING CO., LTD, Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,154

(22) Filed: Oct. 3, 2023

(65) Prior Publication Data

US 2024/0027035 A1 Jan. 25, 2024

Related U.S. Application Data

(63) Continuation of application No. 17/393,167, filed on Aug. 3, 2021, now Pat. No. 11,808,414.

(30) Foreign Application Priority Data

Aug. 4, 2020 (CN) ......................... 202021590775.6

(51) Int. Cl.

| | |
|---|---|
| ***F21K 9/65*** | (2016.01) |
| ***F21K 9/233*** | (2016.01) |
| ***F21K 9/237*** | (2016.01) |
| ***F21V 23/00*** | (2015.01) |
| ***F21V 23/04*** | (2006.01) |
| ***F21V 33/00*** | (2006.01) |
| *F21Y 115/10* | (2016.01) |

(52) U.S. Cl.

CPC ................ *F21K 9/65* (2016.08); *F21K 9/233* (2016.08); *F21K 9/237* (2016.08); *F21V 23/006* (2013.01); *F21V 23/04* (2013.01); *F21V 33/0056* (2013.01); *F21Y 2115/10* (2016.08)

(58) Field of Classification Search

CPC . F21K 9/65; F21K 9/233; F21K 9/237; F21V 23/006; F21V 23/04

See application file for complete search history.

(56) References Cited

U.S. PATENT DOCUMENTS 7,993,025 B2 * 8/2011 Chiu ....................... F21V 29/83 362/249.02

2009/0237940 A1 * 9/2009 Wu ......................... F21K 9/233 362/280

(Continued)

*Primary Examiner* — Christopher E Dunay

(74) *Attorney, Agent, or Firm* — Chun-Ming Shih; LANWAY IPR SERVICES

(57) ABSTRACT

A lighting apparatus includes a lens, a cup housing, a light source and a top cover. The cup housing has a surrounding wall and a light source holder. The cup housing is installed on a fixed platform. The light source is placed on the light source holder. The cup housing and the top cover form a container space for storing the lens and the light source. A top end of the lens is attached to the top cover. A second end of the lens faces to the light source. A relative distance between the lens and the light source is adjustable to change a light pattern of a output light of the light source. The output light is a light of the light source passing through the lens.

16 Claims, 7 Drawing Sheets

(56) References Cited

U.S. PATENT DOCUMENTS

| | | | | |
|---|---|---|---|---|
| 2014/0313744 | A1* | 10/2014 | Collias | F21V 5/045 362/311.02 |
| 2015/0070900 | A1* | 3/2015 | Fleming | F21V 17/02 362/311.01 |
| 2015/0369430 | A1* | 12/2015 | Vamberi | F21K 9/65 362/235 |
| 2016/0018093 | A1* | 1/2016 | Van Winkle | F21V 23/006 362/295 |
| 2017/0227177 | A1* | 8/2017 | Power | F21V 7/043 |
| 2020/0187319 | A1* | 6/2020 | Jiang | H05B 45/20 |
| 2020/0224857 | A1* | 7/2020 | Liang | F21V 14/06 |
| 2020/0393119 | A1* | 12/2020 | Portinga | F21K 9/23 |

* cited by examiner

LIGHTING APPARATUS

RELATED APPLICATION

The present application is a continued application of U.S. patent application Ser. No. 17/393,167.

FIELD

The present invention is related to a lighting apparatus, and more particularly related to a lighting apparatus with light pattern adjustment.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

SUMMARY

In some embodiments, a lighting apparatus includes a lens, a cup housing, a light source and a top cover.

The cup housing has a surrounding wall and a light source holder.

The cup housing is installed on a fixed platform.

The light source is placed on the light source holder.

The cup housing and the top cover form a container space for storing the lens and the light source.

A top end of the lens is attached to the top cover.

A second end of the lens faces to the light source.

A relative distance between the lens and the light source is adjustable to change a light pattern of a output light of the light source.

The output light is a light of the light source passing through the lens.

In some embodiments, a connector couples the top cover and the lens for selecting the relative distance from multiple discrete values.

In some embodiments, the cup housing has a bottom part attached to an Edison cap to be installed to an Edison socket of the fixed platform.

In some embodiments, the cup housing has a neck part for connecting the Edison cap.

A manual switch is disposed on the neck part engaging a driver stored inside the cup housing.

The manual switch is operated to change a setting of the driver.

In some embodiments, the lens is rotated with respect to the top cover to change the relative distance to the light source.

In some embodiments, the lens has a handle to be held for rotating the lens with respect to the top cover.

In some embodiments, the handle is moved to a first position for engaging the lens to a first rotation track for rotating the lens with respect to the top cover.

The handle is moved to a second position for escaping the lens from the first rotation track.

In some embodiments, the first rotation track is formed on the top cover for the lens to rotate along the first rotation track to change the relative distance between the light source and the lens.

In some embodiments, the handle is rotated with respect to the top cover in a second rotation track to select a setting of a driver to drive the light source In some embodiments, the setting is corresponding a continuous value of a light intensity of the light of the light source within a predetermined range.

In some embodiments, the handle has a manual switch for changing a setting of a driver for driving the light source.

In some embodiments, an antenna is disposed on the handle.

In some embodiments, the top cover is a light passing cover.

In some embodiments, the top cover includes a ring surrounding the lens.

The light source has a light module for separately emitting a second light passing through the ring.

In some embodiments, the light source is fixed to the top cover.

The top cover is moved with respect to the lens to change the relative distance of the lens to the light source.

In some embodiments, the light source has a light source plate mounted with a first LED module and a second LED module.

The lens engages a pressure sensor.

The lens is pressed to select turning on the first LED module or the second LED module.

The lens has a first part facing to the first LED module and a second part facing to the second LED module.

The first LED module and the second LED module render different light patterns via the first part of the lens and the second part of the lens respectively.

In some embodiments, the lens has an inner wall at the second end for surrounding the light source.

In some embodiments, the light source has a light source plate mounted with a LED module.

The second end of the lens engages the light source plate.

In some embodiments, the top cover includes a ring surrounding the lens.

The light of the light source does not pass through the ring.

An inner diameter of the ring is adjustable.

In some embodiments, the top cover includes a ring surrounding the lens.

The ring is disposed with a speaker.

DETAILED DESCRIPTION

Figure 6:
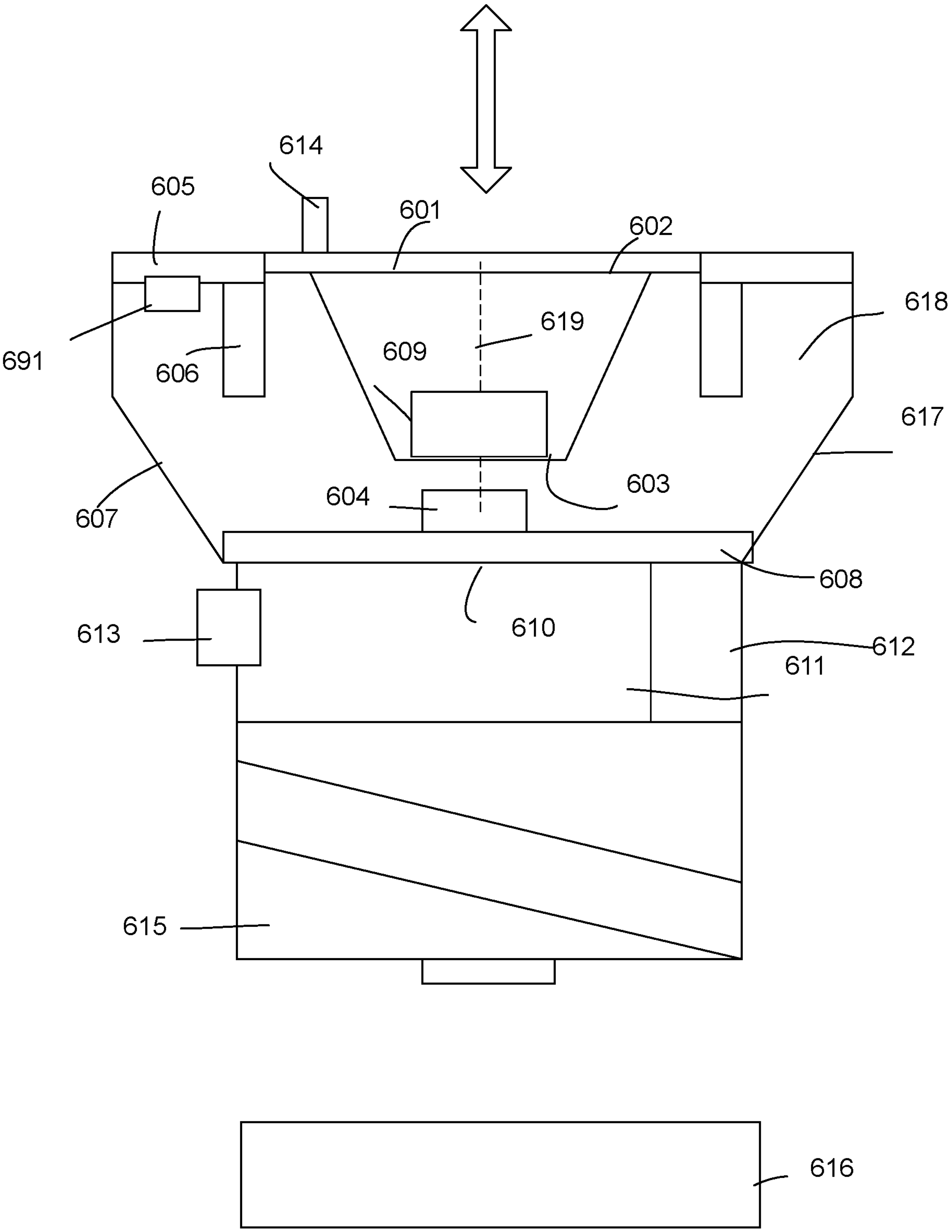
FIG. 6 shows another embodiment.

In FIG. 6, a lighting apparatus includes a lens 601, a cup housing 607, a light source 604 and a top cover 605.

The cup housing 607 has a surrounding wall 617 and a light source holder 610.

The cup housing 607 is installed on a fixed platform, like an Edison socket 616 on a ceiling.

The light source 604 is placed on the light source holder 610.

The cup housing 607 and the top cover 605 form a container space 618 for storing the lens 601 and the light source 604.

A top end 602 of the lens 602 is attached to the top cover 605, e.g. via a connector 606. The connector 606 may include a screw groove and corresponding screw protruding structures on the connecting area of the lens 601 and the top cover 605 for the lens 601 to move with respect to the top cover 605 to change a relative distance 619 between the lens 601 and the light source 604.

A second end 603 of the lens 601 faces to the light source 604.

A relative distance 619 between the lens 601 and the light source 604 is adjustable to change a light pattern of a output light of the light source. For example, the lens is a condensing lens. By changing the position of the light source 604 relative to the lens 601, a different light pattern of light beam may be formed, e.g. a different light diameter.

The output light is a light of the light source passing through the lens 602.

In some embodiments, a connector 606 couples the top cover 605 and the lens 601 for selecting the relative distance 619 from multiple discrete values. For example, the connector 606 may have several segment points for the lens 601 to stay unless an external force larger than a predetermined value is applied on the lens 601. Some labels may be provided to indicate different candidate values corresponding to the positions.

In some embodiments, the cup housing 607 has a bottom part 610 attached to an Edison cap 615 to be installed to an Edison socket 616 of the fixed platform.

In some embodiments, the cup housing 607 has a neck part 612 for connecting the Edison cap 615.

A manual switch 613 is disposed on the neck part 612 engaging a driver 611 stored inside the cup housing 607.

The manual switch 613 is operated to change a setting of the driver 611. For example, the manual switch 613 may include a slider for indicating one from several color temperatures for indicating how the driver 611 to generate corresponding driving currents to different types of LED modules of the light source 604 to mix a corresponding light color temperature.

In some embodiments, the lens 601 is rotated with respect to the top cover 605 to change the relative distance 619 to the light source. For example, the connector 606 includes a screw groove as a rotation track for rotating the lens 601 with respect to the top cover 605 to change the relative distance 619.

In some embodiments, the lens 601 has a handle 614 to be held for rotating the lens with respect to the top cover 605.

Figure 7A:
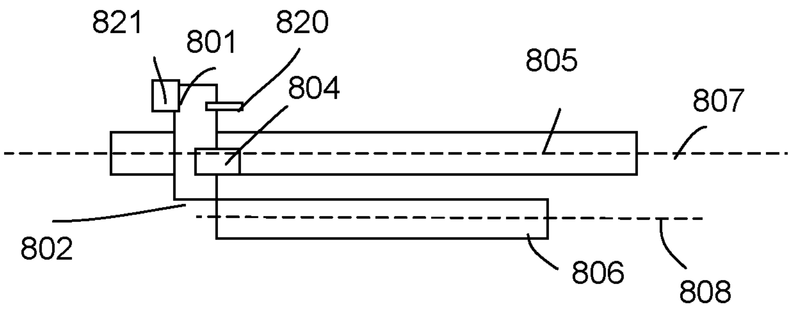
FIG. 7 shows two rotation tracks.
Figure 7B:
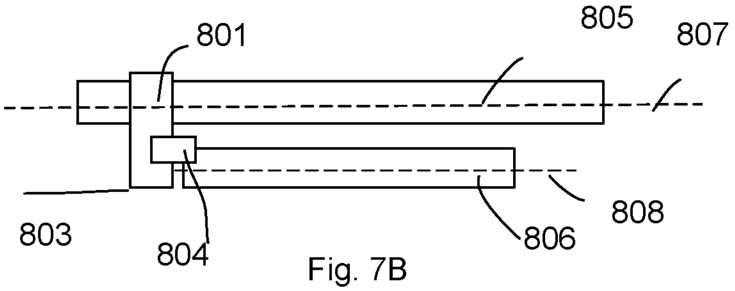

In FIG. 7A and FIG. 7B, the handle 801 is moved to a first position 802 for engaging the lens 805, e.g. with a pin 804, to a first rotation track 807 for rotating the lens 805 with respect to the top cover.

The handle 801 is moved to a second position 803 for escaping the lens 805 from the first rotation track 807.

In FIG. 6, the first rotation track is formed on the top cover 605 for the lens 601 to rotate along the first rotation track to change the relative distance 619 between the light source and the lens.

In FIG. 7A and FIG. 7B, the handle 801 is rotated with respect to the top cover in a second rotation track 808 to select a setting of a driver to drive the light source.

In other words, FIG. 7A and FIG. 7B show an embodiment of a handle that is used for selectively changing the relative distance between the lens and the light source or changing a setting for a driver to control the light source, e.g. to change a different color or a color temperature.

In some embodiments, the setting is corresponding a continuous value of a light intensity of the light of the light source within a predetermined range. For example, the setting may correspond to a maximum light intensity of the light source.

Usually, people buy a light device from a market by recognizing a label showing what light intensity of the light intensity, e.g. 8 W or 12 W. However, people may want to change the setting of the light intensity to a lower value, to fit the environment or to save energy. With such design, people may select a value within a range, e.g. 8 W to 10 W. The continuous value refer to any value within the range, which means unlimited options, instead of several candidate values to be selected. A rotation is helpful on doing such work.

In FIG. 7A, the handle 801 has a manual switch 820 for changing a setting of a driver for driving the light source. For example, the manual switch 820 may include a button, a sliding switch or any other switch for selecting a value. The manual switch 820 may be electrically connected to a driver that is used for control the light source.

In FIG. 7A, an antenna 821 is disposed on the handle 801. Because the handle 801 is exposed outside the lighting apparatus, it is a good position to install an antenna 821 that avoids interference of other components of the lighting apparatus or the platform.

In some embodiments, the top cover is a light passing cover, e.g. allowing light to pass through.

In some embodiments, the top cover includes a ring surrounding the lens.

The light source has a light module for separately emitting a second light passing through the ring. For example, there is a ring of light source disposed on the light source 604 in FIG. 6 for emitting light to the top cover 605.

In some embodiments, the light source is fixed to the top cover. Unlike the setting above, the light source may be moved with respect to the lens to change the relative distance.

The top cover is moved with respect to the lens to change the relative distance of the lens to the light source.

Figure 8:
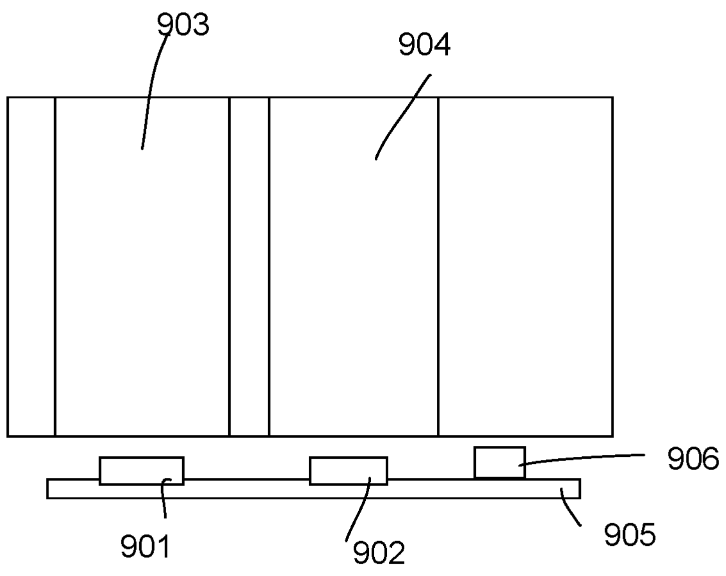
FIG. 8 shows different lens parts.

In FIG. 8, the light source has a light source plate 905 mounted with a first LED module 901 and a second LED module 902.

The lens engages a pressure sensor 906.

The lens is pressed to select turning on the first LED module 901 or the second LED module 902. For example, the first time, the lens is pressed on the sensor 905 indicates the driver to turn on the first LED module 901. The next time when the lens is pressed on the sensor 905, the driver turns on the second LED module 902.

The lens has a first part 903 facing to the first LED module 901 and a second part 904 facing to the second LED module 902.

The first LED module 901 and the second LED module 902 render different light patterns via the first part of the lens and the second part of the lens respectively.

In FIG. 6, the lens 601 has an inner wall 609 at the second end 603 for surrounding the light source 604.

In some embodiments, the light source 604 has a light source plate 608 mounted with a LED module, e.g. at the position showing the light source 604.

The second end 603 of the lens engages the light source plate 608.

In some embodiments, the top cover includes a ring surrounding the lens.

The light of the light source does not pass through the ring.

An inner diameter of the ring is adjustable. For example, a light shielding ring like the one used in a camera to change a diameter of light passing area.

In some embodiments, the top cover includes a ring surrounding the lens.

In FIG. 6, the ring is disposed with a speaker 691. For example, a smart light device receives a music stream and plays the music stream via the speaker. The position is a nice position to install the speaker while providing an adjustment of the light pattern.

Please refer to FIG. 1 to FIG. 5, which shows a detail embodiment.

Figure 1:
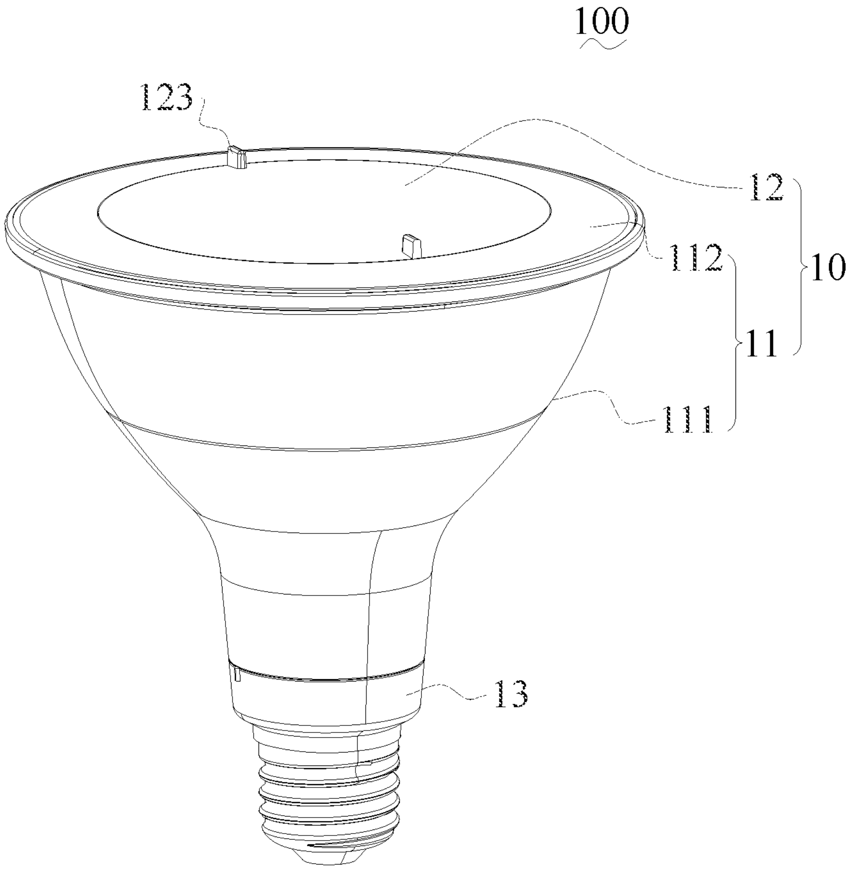
FIG. 1 illustrates a lighting apparatus embodiment.

In FIG. 1, a lighting apparatus 100 includes a handle 123 for adjusting a light cover 12. There is a cup housing 111 connected to a top cover 112 forming a housing body 11. The light cover and the housing 11 body forms a main housing 10 of the lighting apparatus. There is manual switch 13 disposed on a neck part of the main housing 10.

Figure 2:
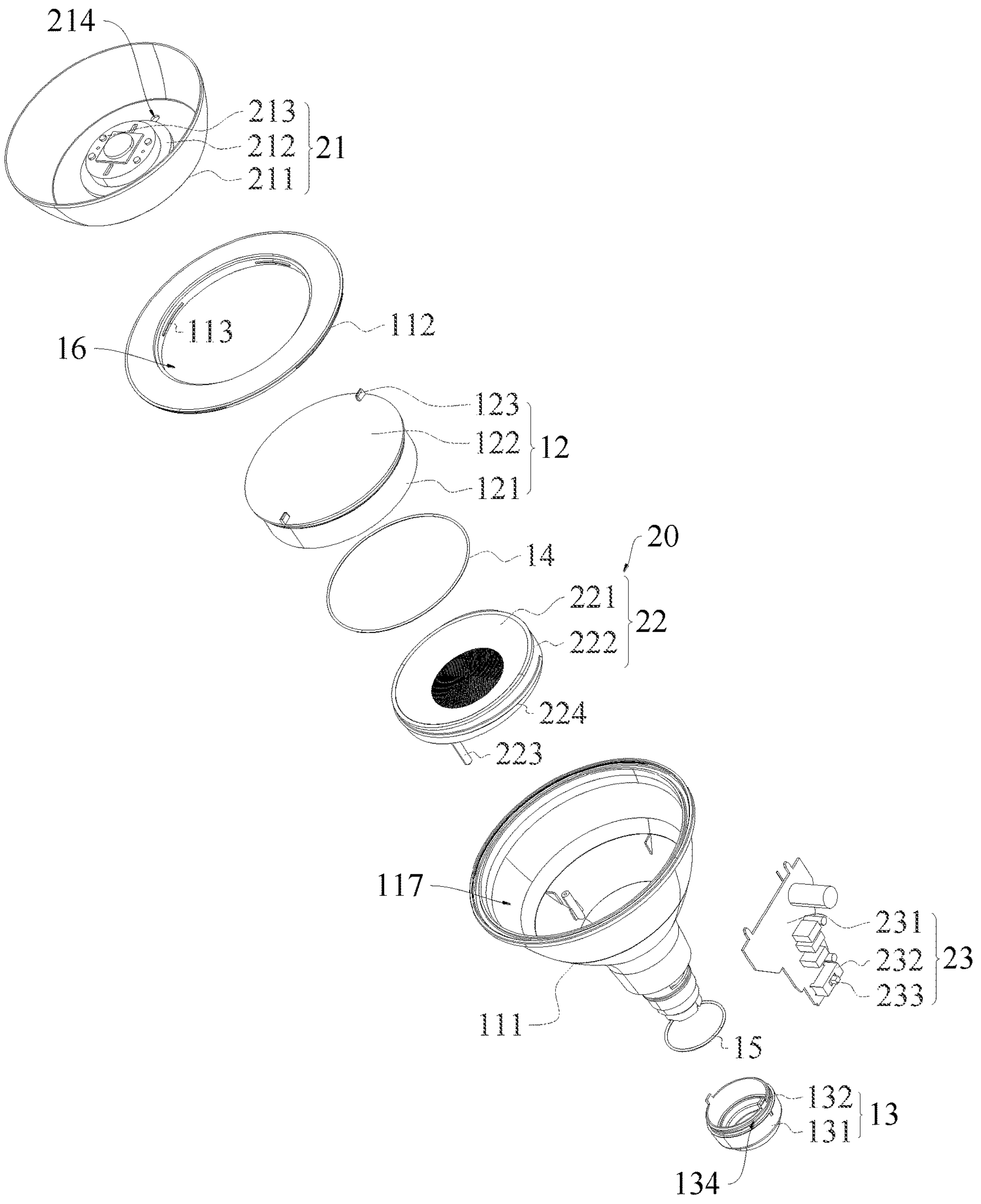
FIG. 2 illustrates an exploded view of the embodiment in FIG. 1.

FIG. 2 shows an exploded view of the example in FIG. 1.

In FIG. 2, there is a positioning hole 214 for aligning the light source module 21 to other components. The light source module 21 has a LED module 213, a heat sink cup 211, and a light source plate 212.

There is a light opening 16 defined by a top cover 112. The cover 112 has a first buckle part 113.

There is a handle 123 connecting to a light plate 122 with a lateral wall 121 forming the light cover 12. A concealing ring 14 is used for preventing water to move in the lighting apparatus.

The lens 22 has a lens body 221 and a lens ring 222. There is a screw protruding structure 224 to move along a rotation track. There is a positioning column 223 for keeping a relative position of the lens 22.

A heat dissipation cavity 117 is provided in the cup housing 111. There is a driver 23 with a switch 232 and a switch handle 233 mounted on a driver printed circuit board 231. A concealing ring 15 is used for preventing water to move in the lighting apparatus. A concealing groove 134 is used for installing the concealing ring 15. There is a second buckle part 131 and a adjusting sleeve 131 to form a manual switch 13.

Figure 3:
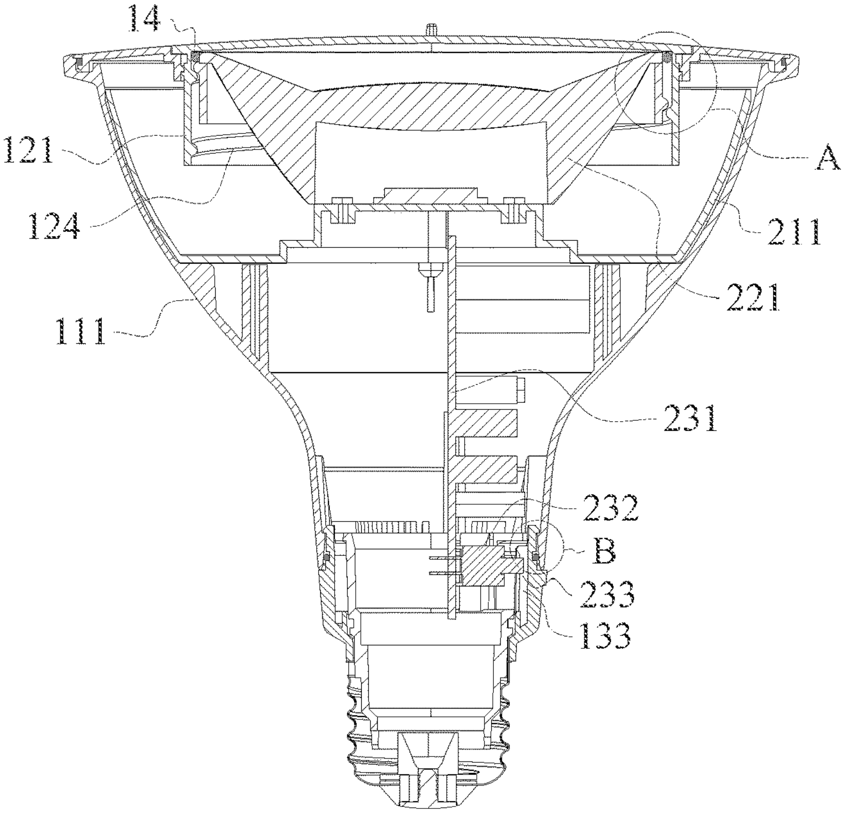
FIG. 3 illustrates a cross-sectional view of the example in FIG. 1.

FIG. 3 show a cross-sectional view of the example in FIG. 2. The same reference numerals refer to the same components and are not described again.

Figure 4:
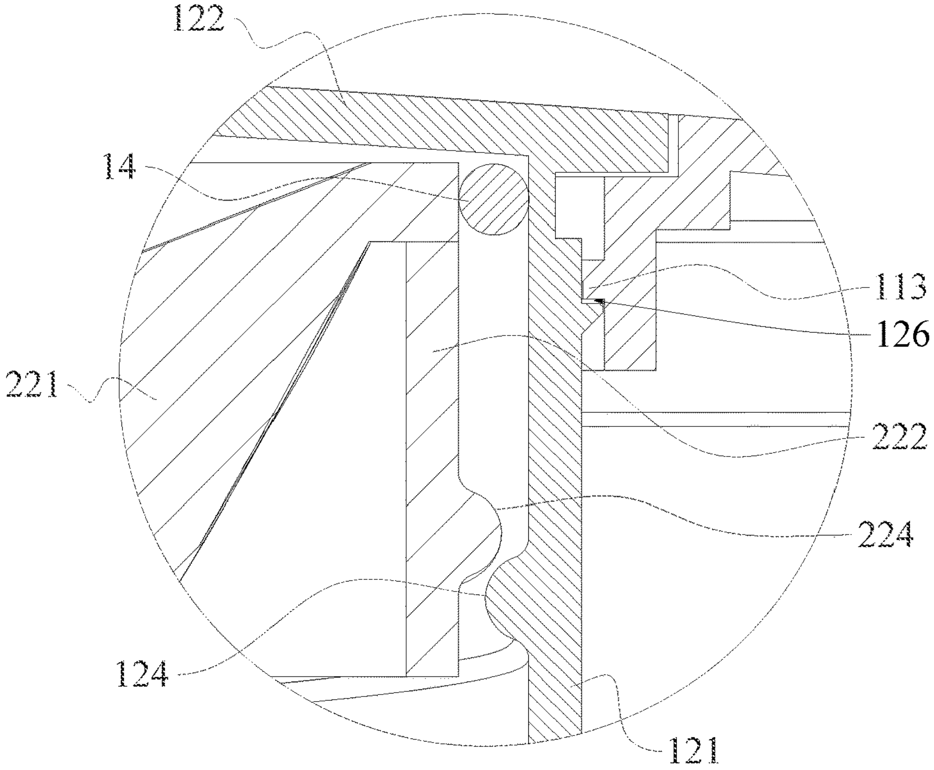
FIG. 4 illustrates a zoom-up view of a portion of components in the example of FIG. 1.

FIG. 4 show a zoom-up view of the example how the lens is moved relative to the top cover.

In FIG. 4, there is a concealing ring 14. The light plate 122 has a first sliding groove 126 with a corresponding sliding structure 113. The lens body 221 has a lateral wall 222 that has a protruding screw unit 224 to move along an inner groove unit 124 on the lateral wall 121.

Figure 5:
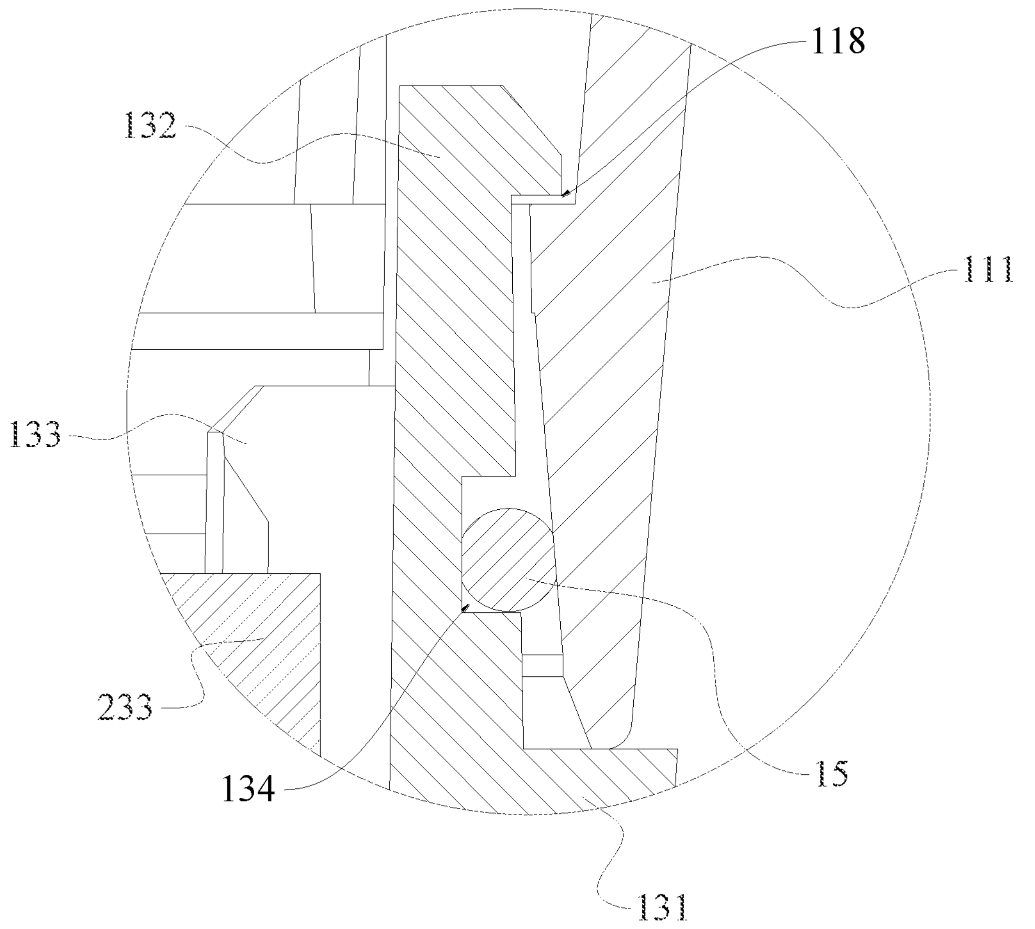
FIG. 5 illustrates a manual switch example.

FIG. 5 shows a zoom-up view of the manual switch on the neck part.

In FIG. 5, the cup housing 111 has a second concealing ring disposed in a concealing groove 134. A moving plate 133 is used for triggering a handle 233 to change a setting. There is a second buckle part 132 to connect the components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a lens;

a cup housing having a surrounding wall and a light source holder, wherein the cup housing is installed on a fixed platform;

a light source placed on the light source holder; and a top cover, wherein the cup housing and the top cover form a container space for storing the lens and the light source, wherein a top end of the lens is attached to the top cover, wherein a second end of the lens faces to the light source, wherein a relative distance between the lens and the light source is adjustable to change a light pattern of a output light of the light source, wherein the output light is a light of the light source passing through the lens, wherein the lens is rotated with respect to the top cover to change the relative distance to the light source, wherein a connector couples the top cover and the lens for selecting the relative distance from multiple discrete values, wherein the connector has several segment points for the lens to stay unless an external force larger than a predetermined value is applied on the lens.

2. The lighting apparatus of claim 1, wherein the lens has a handle to be held for rotating the lens with respect to the top cover.

3. The lighting apparatus of claim 2, wherein the handle is moved to a first position for engaging the lens to a first rotation track for rotating the lens with respect to the top cover, wherein the handle is moved to a second position for escaping the lens from the first rotation track.

4. The lighting apparatus of claim 2, wherein the handle is rotated with respect to the top cover in a second rotation track to select a setting of a driver to drive the light source.

5. The lighting apparatus of claim 4, wherein the setting is corresponding a continuous value of a light intensity of the light of the light source within a predetermined range.

6. The lighting apparatus of claim 2, wherein the handle has a manual switch for changing a setting of a driver for driving the light source.

7. The lighting apparatus of claim 1, wherein an antenna is disposed on the handle.

8. The lighting apparatus of claim 1, wherein the cup housing has a bottom part attached to an Edison cap to be installed to an Edison socket of the fixed platform.

9. The lighting apparatus of claim 8, wherein the cup housing has a neck part for connecting the Edison cap, wherein a manual switch is disposed on the neck part engaging a driver stored inside the cup housing, wherein the manual switch is operated to change a setting of the driver.

10. The lighting apparatus of claim 1, wherein the first rotation track is formed on the top cover for the lens to rotate along the first rotation track to change the relative distance between the light source and the lens.

11. The lighting apparatus of claim 1, wherein the top cover is a light passing cover.

12. The lighting apparatus of claim 11, wherein the top cover comprises a ring surrounding the lens, wherein the light source has a light module for separately emitting a second light passing through the ring.

13. The lighting apparatus of claim 1, wherein the light source is fixed to the top cover, wherein the top cover is moved with respect to the lens to change the relative distance of the lens to the light source.

14. The lighting apparatus of claim 1, wherein the lens has an inner wall at the second end for surrounding the light source.

15. The lighting apparatus of claim 14, wherein the light source has a light source plate mounted with a LED module, wherein the second end of the lens engages the light source plate.

16. The lighting apparatus of claim 1, wherein the top cover comprises a ring surrounding the lens, wherein the ring is disposed with a speaker.

* * * * *